United States Patent
Chen

(10) Patent No.: US 10,476,218 B1
(45) Date of Patent: Nov. 12, 2019

(54) POWER DISTRIBUTOR WITH MULTIPLE DISPLAY PORTS

(71) Applicant: Liang Light Chen, Los Gatos, CA (US)

(72) Inventor: Liang Light Chen, Los Gatos, CA (US)

(*) Notice: Subject to any disclaimer, the term of this patent is extended or adjusted under 35 U.S.C. 154(b) by 0 days.

(21) Appl. No.: 16/013,100

(22) Filed: Jun. 20, 2018

(51) Int. Cl.
| G06F 1/20 | (2006.01) |
| H01R 27/02 | (2006.01) |
| G06F 1/26 | (2006.01) |
| H01R 25/00 | (2006.01) |

(52) U.S. Cl.
CPC ............ *H01R 27/02* (2013.01); *G06F 1/266* (2013.01); *H01R 25/006* (2013.01)

(58) Field of Classification Search
CPC ...... G06F 1/1601; G06F 3/1446; G06F 1/188; G06F 1/189; G06F 3/147; G06F 1/26; G06F 1/1654; G06F 1/1637; G09F 9/3023; G09G 2330/02; G09G 2360/04; G09G 5/003; H05K 5/0017; H05K 7/1427
USPC ............... 361/622, 679.29, 752; 345/1.3, 1.1
See application file for complete search history.

(56) References Cited

U.S. PATENT DOCUMENTS

| 7,268,998 B2 * | 9/2007 | Ewing .................. H05K 7/1492 174/59 |
| 7,324,006 B2 * | 1/2008 | Godard .............. H01R 13/6683 340/635 |
| 7,457,106 B2 | 11/2008 | Ewing et al. |
| 7,982,335 B2 | 7/2011 | Aldag et al. |
| 8,264,099 B2 | 9/2012 | Aldag et al. |
| 8,427,007 B2 | 4/2013 | Jansma et al. |
| 9,157,941 B2 | 10/2015 | Lin |
| 9,490,664 B2 | 11/2016 | Lo et al. |
| 2002/0135974 A1 * | 9/2002 | Bell ....................... A47G 1/142 361/679.41 |
| 2002/0183862 A1 * | 12/2002 | Chen ..................... G06F 1/1626 700/1 |
| 2005/0101193 A1 * | 5/2005 | Godard ............. H01R 13/6683 439/652 |
| 2006/0072269 A1 | 4/2006 | Staples |
| 2009/0051220 A1 * | 2/2009 | Cleveland ................ H02G 3/00 307/13 |
| 2011/0205693 A1 * | 8/2011 | Jansma ................... G06F 1/266 361/601 |
| 2012/0188279 A1 * | 7/2012 | Demaine ................. A63F 13/10 345/633 |

(Continued)

FOREIGN PATENT DOCUMENTS

| CN | 205901286 U | 1/2017 |
| JP | 3180732 U | 1/2013 |
| WO | 2016072793 A3 | 6/2016 |

*Primary Examiner* — Mandeep S Buttar
(74) *Attorney, Agent, or Firm* — Douglas L. Weller

(57) ABSTRACT

A power distributor has a plurality of electrical sockets and a plurality of display ports. Each display port in the plurality of display ports is available to provide connection to a detachable display. The display ports in the plurality of display ports are located at different locations on the power distributor so that when the detachable display is mounted on a first display port of the plurality of display ports, the detachable display faces in a direction that is different than any other directions the detachable display would face if mounted on any other display port in the plurality of display ports.

18 Claims, 8 Drawing Sheets

(56) References Cited

U.S. PATENT DOCUMENTS

| | | | |
|---|---|---|---|
| 2014/0363988 A1* | 12/2014 | An | G06F 1/1632 |
| | | | 439/39 |
| 2016/0174400 A1* | 6/2016 | Nakano | H05K 5/0017 |
| | | | 361/807 |
| 2016/0190748 A1 | 6/2016 | Emby | |
| 2017/0054323 A1 | 2/2017 | Lo et al. | |
| 2017/0097671 A1* | 4/2017 | Hutchison | G06F 1/266 |

* cited by examiner

POWER DISTRIBUTOR WITH MULTIPLE DISPLAY PORTS

BACKGROUND

Independent power supply equipment of multiple outlets or device power distributors are widely used in the real world. A power distributor is a block of electrical sockets that is also variously referred to as a power strip, an extension block, a power board, a power bar, a plug board, a trailer lead and by other names.

DESCRIPTION OF THE EMBODIMENT

The implementations disclosed herein describe a detachable display for a power distributor. The power distributor has multiple display ports that will receive the detachable display. This allows the detachable display to be attached to the power distribution at a location and orientation that will be most accessible to a user of the power distributor. The display ports can be hard wired or can provide a wireless interface.

The detachable display is used, for example, to show power and communication information processed in a microcontroller of the power distributor. For example, the detachable display can be detached from one power distributor and attached to another power distributor. For applications that require many power distributors, a single detachable display can be used to install and configure all the power distributors. This can result in significant savings over a system where each power distributor has a dedicated display.

The mounting location of the detachable display on a power distributor can be based on the installation location of the power distributor. The orientation of the detachable display can also be varied to accommodate an angle from which the detachable display will be read.

For example, the detachable display can be magnetically attached to a power distributor with or without use of a locating pin. Alternatively, or in addition, a secure plug connector can be used to secure the portable display to the power distributor while providing hardwire signal and power connections. A screw or other physical attachment device (such as a clasp) can also be used to securely hold the portable display at a desired on the power distributor.

Figure 1:
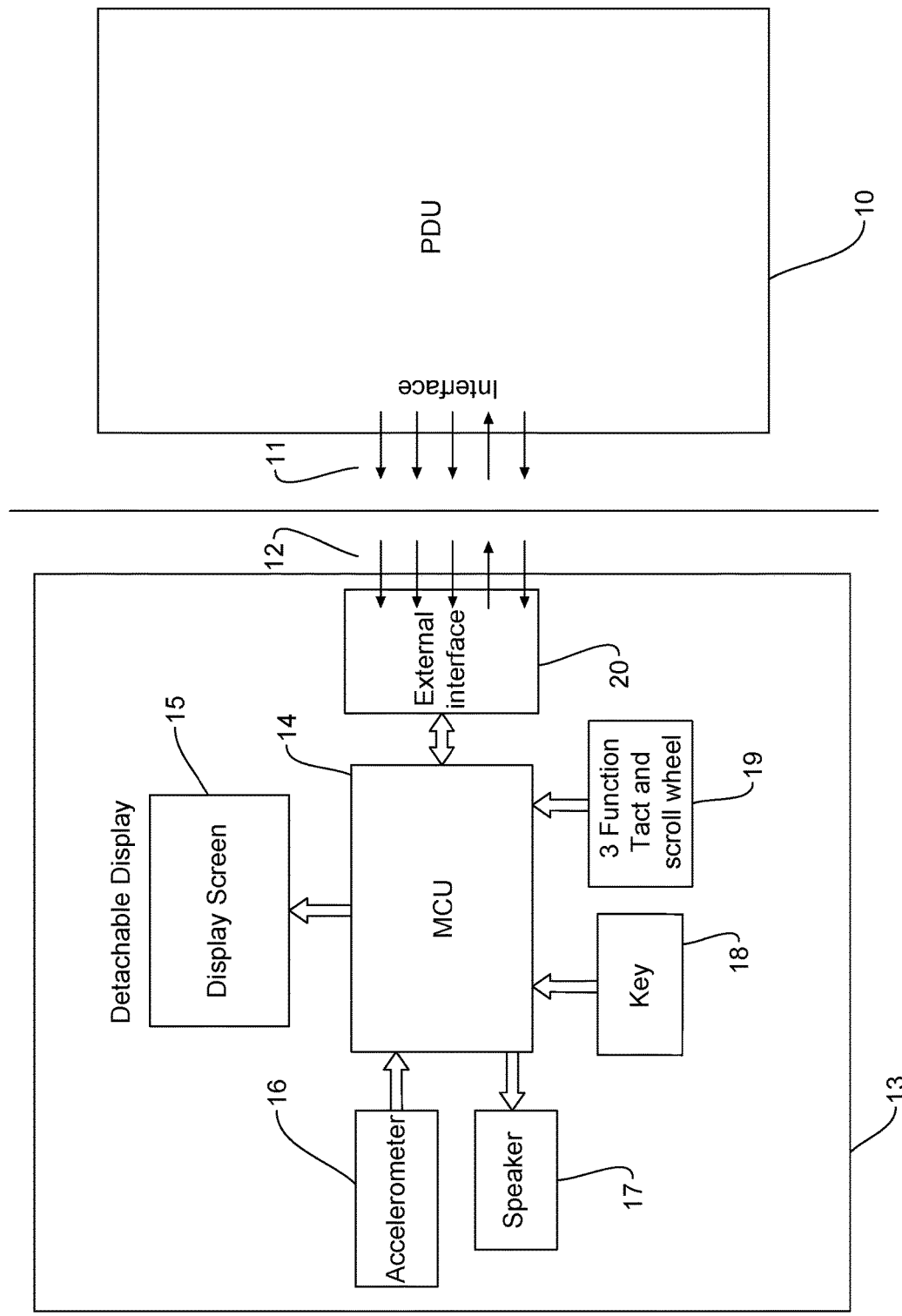
FIG. 1 shows a block diagram of a detachable display for a power distributor in accordance with an implementation.

FIG. 1 shows a simplified block diagram for a detachable display 13. Detachable display 13 includes, for example, a microcontroller unit 14 a display screen 15 and an external interface 20. For example, display screen 15 is a liquid crystal display (LCD). Alternatively, display screen 15 is implemented using light emitting diodes (LEDs) or any other type of technology available to display information.

External interface 20 communicates with an interface of a power distributor 10. Signals 11 and signals 12 represent communication between power distributor 10 and detachable display 13. Power for detachable display 13 can also be supplied through one of signals 11 through 12. Alternatively, detachable display 13 can use an internal battery as a power source. Communication between power distributor 10 and detachable display 13 using signals 11 and signals 12 can be accomplished using wires. Alternatively, external interface 20 has wireless communication capability and communicates wirelessly with the interface of power distributor 10.

Depending upon desired application, detachable display 13 can incorporate and use additional functionality. For example, in FIG. 1, detachable display 13 is shown to optionally include an accelerometer 16, a speaker 17, a key 18 and a three-function tact and scroll wheel 19. Additional desired functionality can also be added to detachable display 13.

Figure 2:
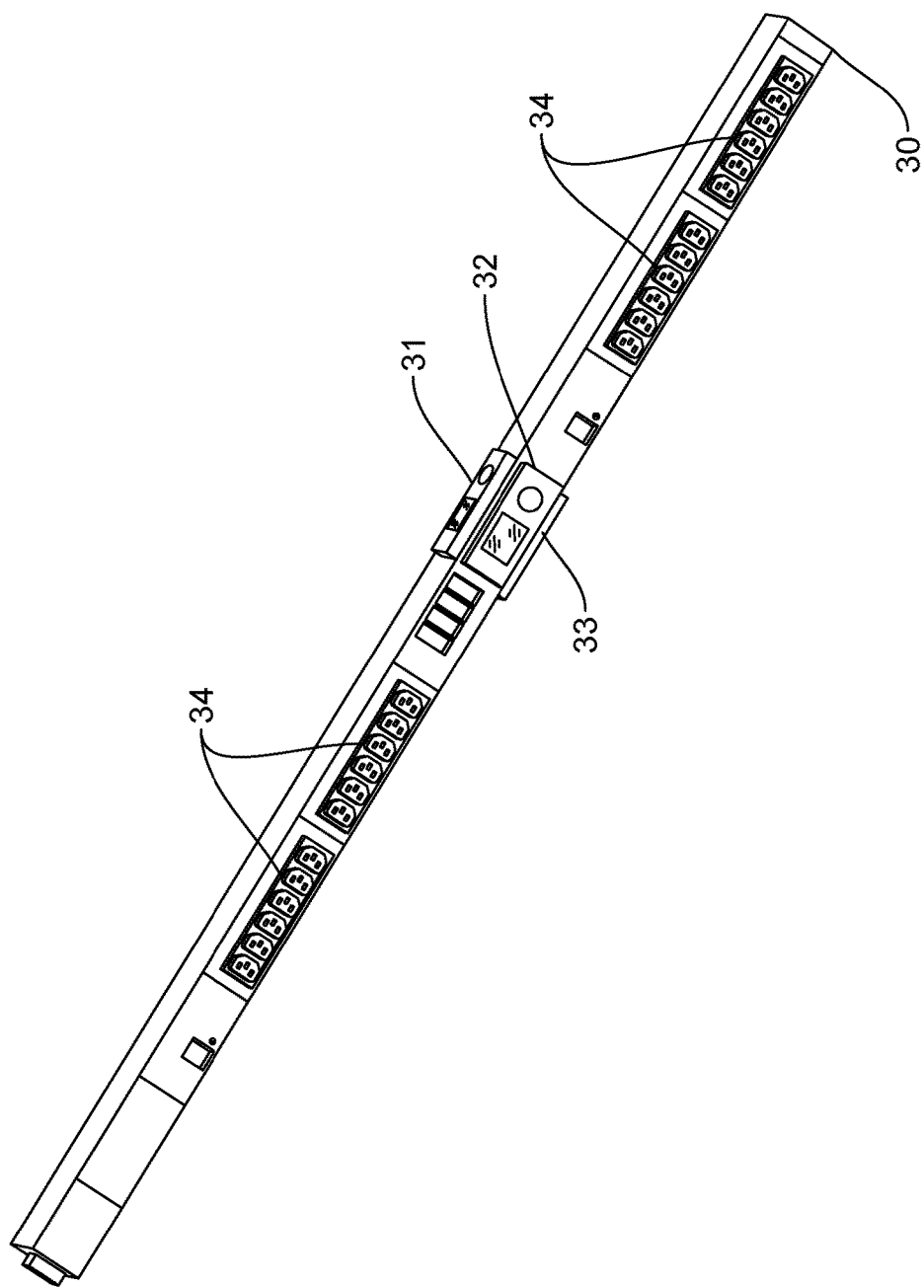
FIG. 2 shows three detachable displays mounted on a power distributor in accordance with an implementation.

FIG. 2 shows a power distributor 30 that includes power outlets 34. Power outlets 34 serve as electrical sockets. A detachable display 31, a detachable display 32 and a detachable display 33 are all shown attached to power distributor 30. While it would be unusual for all three of detachable display 31, detachable display 32 and detachable display 33 to be attached at the same time to power distributor 30, the locations of detachable display 31, detachable display 32 and detachable display 33 on power distributor 30 illustrate the locations of display ports on power distributor 30 that are available to receive a detachable display. Typically, at most, only one of the three available display ports of power distributor 30 would be connected to a detachable display at any one time. As shown in FIG. 2, each of detachable display 31, detachable display 32 and detachable display 33 faces in a different direction the other detachable displays.

Figure 3:
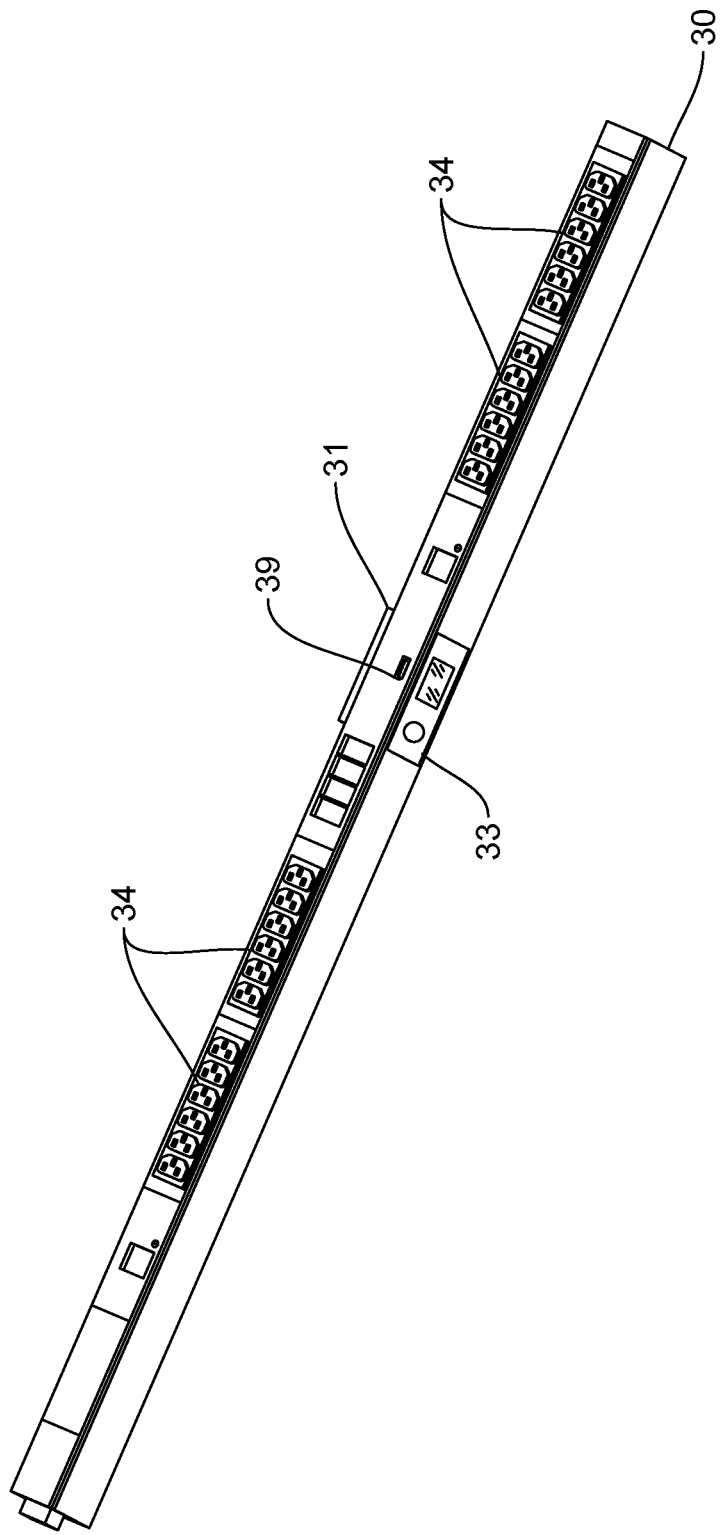
FIG. 3 shows one of the detachable displays shown in FIG. 2 removed from the power distributor in accordance with an implementation.

FIG. 3 shows detachable display 32 having been removed from power distributor 30. A connector 39 is shown revealed at the location on power distributor 30 where detachable display 32 was attached. For example, connector 39 includes contacts for power and/or signal wires of a detachable display. A region around connector 39 is composed of ferromagnetic material used to magnetically attach a detachable display to power distributor 30. Alternatively, a plug can be used to physically hold a detachable display to power distributor 30. Additionally, instead of using hard wire to communicate with detachable displays, power distributor 30 can be equipped with wireless communication capability.

Figure 4:
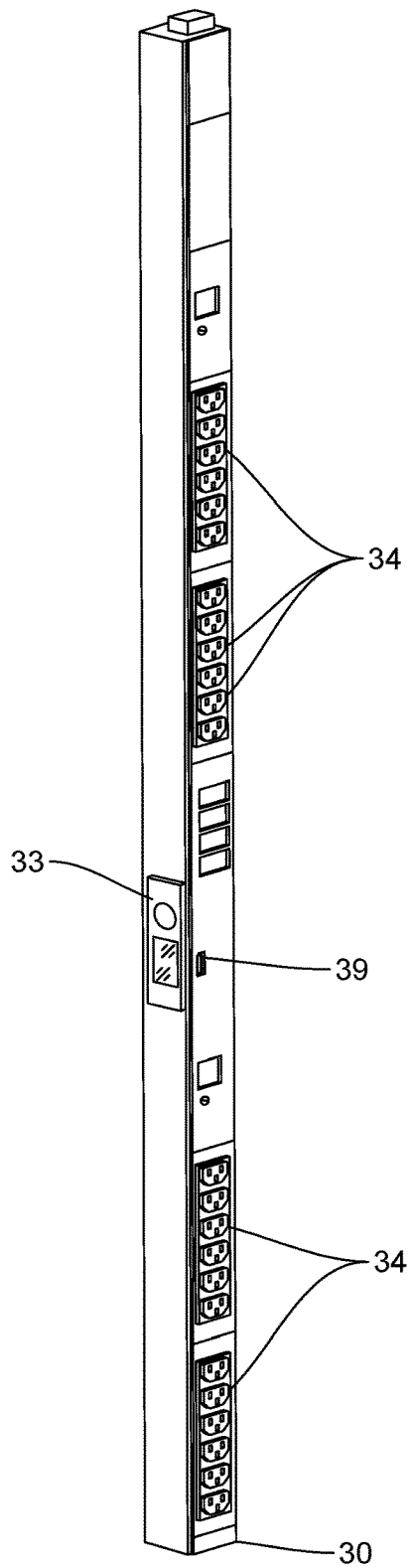
FIG. 4 shows a single detachable display mounted on a power distributor in accordance with an implementation.

FIG. 4 shows only detachable display 33 still connected to power distributor 30. Detachable display 33 can be attached to any of the three available display port locations of power distributor 30. While power distributor 30 is shown with three display ports, a power distributor can be designed with more or fewer display ports, depending upon design preferences.

Figure 5:
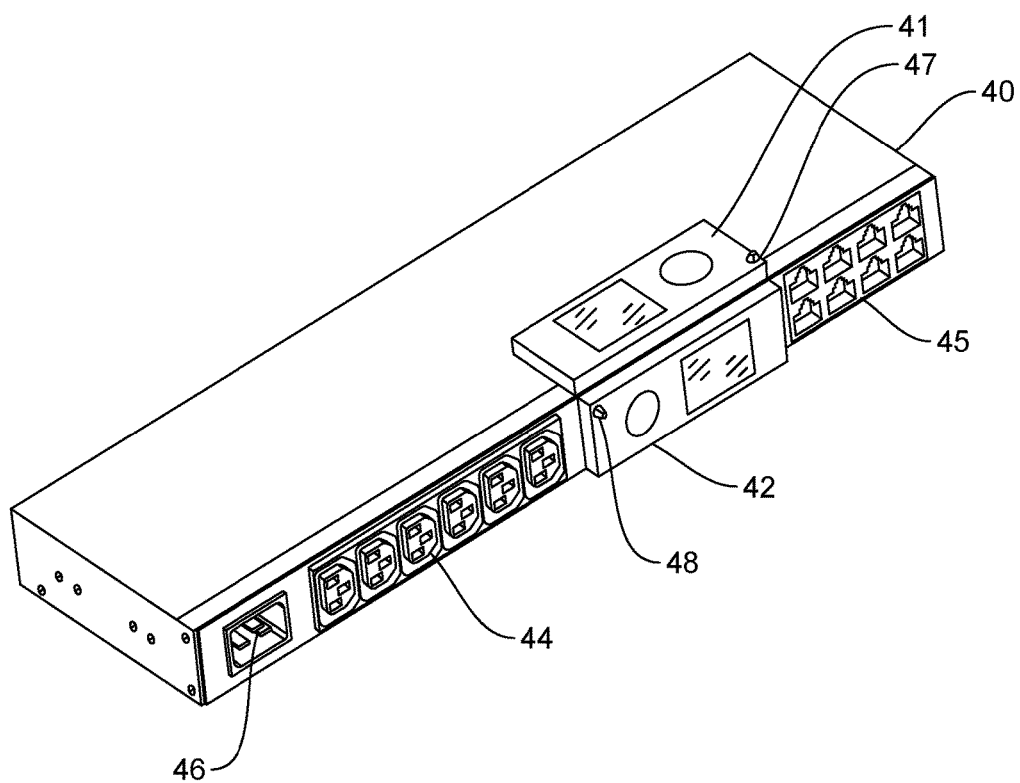
FIG. 5 shows two detachable displays mounted on a power distributor in accordance with an implementation.

FIG. 5 shows a power distributor 40 that includes power outlets 44, a power-in port 46 and networking ports 45. Power outlets 44 serve as electrical sockets. For example, networking ports 45 are Ethernet ports. A detachable display 41 and a detachable display 42 are shown attached to power distributor 40. While it would be unusual for both detachable display 41 and detachable display 42 to be attached at the same time to power distributor 40, the locations of detachable display 41 and detachable display 42 on power distributor 40 indicate the locations of display ports on power distributor 40 that are available to receive a detachable display. Typically, at most, only one of the three available display ports of power distributor 40 would be connected a detachable display at any one time.

A screw 47 is used to physically secure detachable display 41 to power distributor 40. A screw 48 is used to physically secure detachable display 42 to power distributor 40. Also, in FIG. 5, detachable display 41 and detachable display 42 are in different orientations, with the LCD for detachable display 41 oriented towards a left side of power distributor 40 and the LCD for detachable display 42 oriented towards a right side of power distributor 40. This illustrates the flexibility in mounting orientation of detachable display on display ports of power distributor 40.

Figure 6:
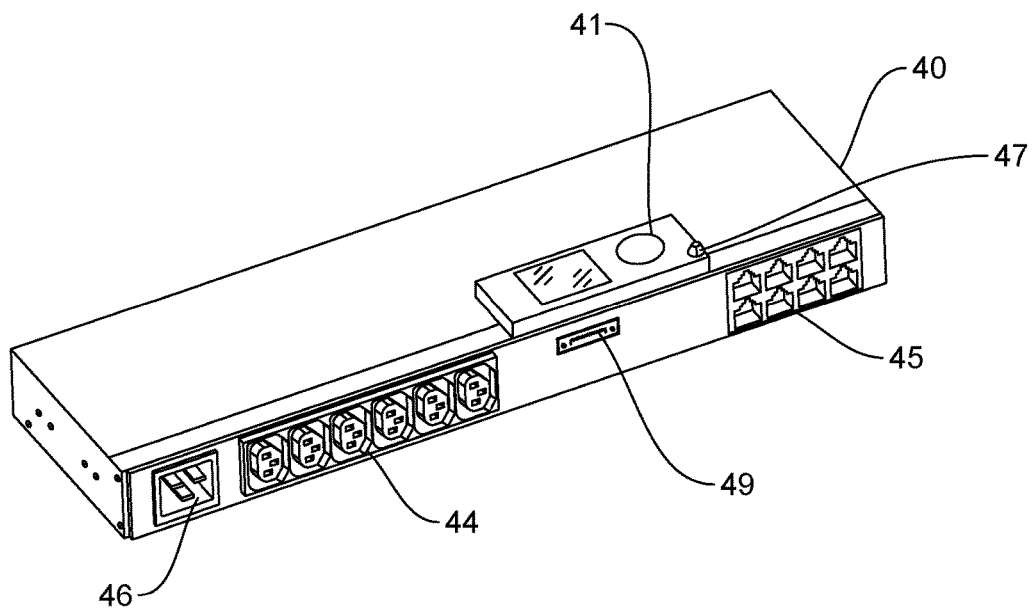
FIG. 6 shows a single detachable display mounted on a power distributor in accordance with an implementation.

FIG. 6 shows detachable display 42 having been removed from power distributor 40. A connector 49 is shown revealed at the location on power distributor 40 where detachable display 42 was attached. For example, connector 49 includes contacts for power and/or signal wires of a detachable display. Instead of using hard wire to communicate with detachable displays, power distributor 40 can be equipped with wireless communication capability.

Figure 7:
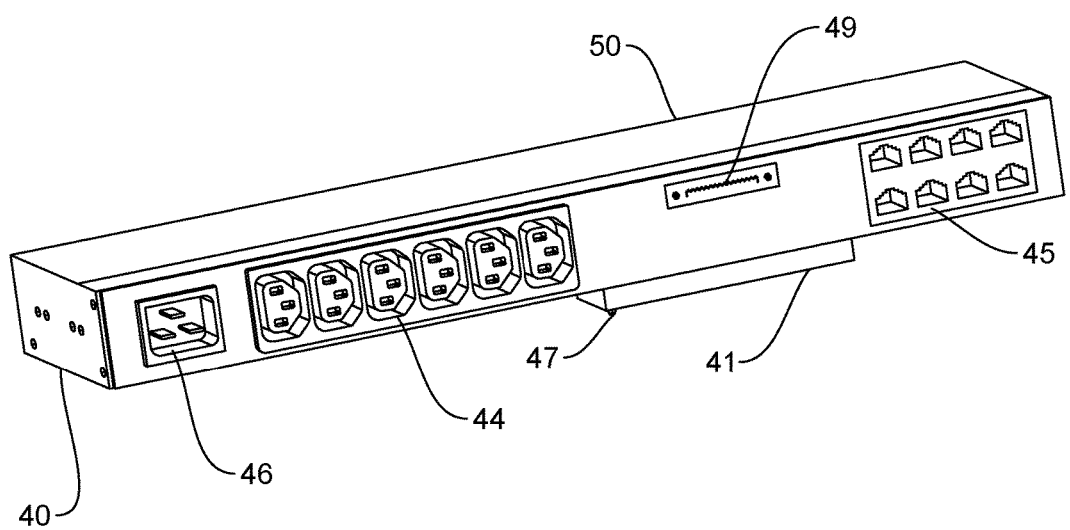
FIG. 7 shows a single detachable display mounted on a power distributor in accordance with an implementation.

FIG. 7 shows detachable display 41 moved to a different location on power distributor 40. To move detachable display 41, screw 47 was loosened. After detachable display 41 was placed in a new location on power distributor 40, screw 47 was tightened to hold detachable display 41 securely to the new location on power distributor 40. In the case where detachable display 42 was magnetically attached and used wireless communication, no connector need appear on power distributor 40. Instead, a magnet at or near location 50 or within detachable display 42 is used to secure detachable display 42 to power distributor 40 and wireless communication is used.

Figure 8:
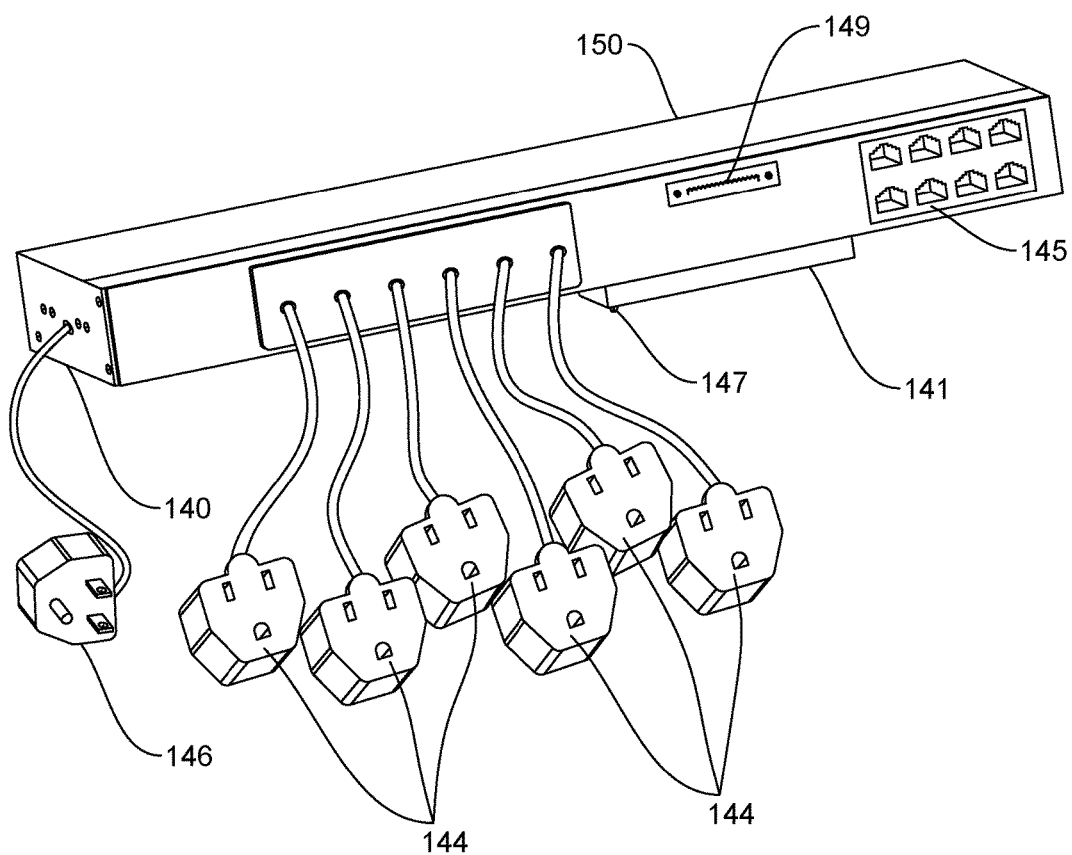
FIG. 8 shows a single detachable display mounted on a power distributor in accordance with an implementation.

FIG. 8 shows a power distributor 140 that includes power outlets 144 with wire extensions, a power-in plug 146 with a wire extension and networking ports 145. Power outlets 144 with the wire extension serve as electrical sockets for power distributor 140. For example, networking ports 145 are Ethernet ports. A detachable display 141 is shown attached to power distributor 140. A connector 149 is shown revealed at the location on power distributor 40 where a detachable display could be relocated. Alternatively, or in addition, in the case where the detachable display is magnetically attached and uses wireless communication, no connector need appear. Instead, a magnet at or near location 150 or within the detachable display is used to secure the detachable display to power distributor 140 and wireless communication is used.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A power distributor comprising:
    a plurality of electrical sockets;
    a detachable display; and,
    a plurality of display ports, each display port of the plurality of display ports available to provide connection to the detachable display, the plurality of display ports being located at different locations on the power distributor so that when the detachable display is mounted on a first display port of the plurality of display ports, the detachable display faces in a direction that is different than any other directions the detachable display would face if mounted on any other display port in the plurality of display ports;
    wherein each display port of the plurality of display ports includes a plug connector that provides hardwire signal connection to the detachable display so that movement of the detachable display can be accomplished by unplugging the detachable display from the plug connector of one display port of the plurality of display ports and plugging the detachable display into another plug connector of another display port of the plurality of display ports.

2. A power distributor as in claim 1 wherein the detachable display includes:
    a microcontroller;
    a display screen; and,
    an external interface that communicates with an interface for each of the plurality of display ports.

3. A power distributor as in claim 2 wherein the detachable display is powered through the external interface.

4. A power distributor as in claim 2 wherein the detachable display includes a battery.

5. A power distributor as in claim 2 wherein the display screen is a liquid crystal (LCD) display.

6. A power distributor as in claim 2 wherein the display screen is implemented using light emitting diodes (LEDs).

7. A power distributor as in claim 2 wherein the detachable display additionally includes:
    an accelerometer.

8. A power distributor as in claim 2 wherein the detachable display additionally includes:
    a speaker.

9. A power distributor as in claim 2 wherein the detachable display additionally includes:
    a tact and scroll wheel.

10. A power distributor as in claim 1, additionally comprising:
    a plurality of networking ports.

11. A power distributor as in claim 1, wherein the detachable display is magnetically attached at the first display port of the plurality of display ports.

12. A power distributor as in claim 1, wherein the detachable display is attached at the first display port of the plurality of display ports using a physical attachment device.

13. A power distributor as in claim 1, wherein the detachable display includes a wired interface through which the detachable display communicates with an internal wired interface within the power distributor.

14. A power distributor comprising:
    a plurality of electrical sockets; and
    a plurality of display ports, each display port in the plurality of display ports available to provide connection to a detachable display, the plurality of display ports being located at different locations on the power distributor so that when the detachable display is mounted on a first display port of the plurality of display ports, the detachable display faces in a direction that is different than any other directions the detachable display would face if mounted on any other display port in the plurality of display ports;
    wherein each display port of the plurality of display ports includes a plug connector that provides hardwire signal connection to the detachable display so that movement of the detachable display can be accomplished by unplugging the detachable display from the plug connector of one display port of the plurality of display ports and plugging the detachable display into another plug connector of another display port of the plurality of display ports.

15. A power distributor as in claim 14, additionally comprising:
   a plurality of networking ports.

16. A power distributor as in claim 14, wherein the detachable display is magnetically attached at the first display port of the plurality of display ports.

17. A power distributor as in claim 14, wherein the detachable display is attached at the first display port of the plurality of display ports using a physical attachment device.

18. A power distributor as in claim 14, additionally comprising:
   a wired interface that communicates with a wired interface of the detachable display.

* * * * *